US008549506B2

(12) United States Patent
Meijer et al.

(10) Patent No.: US 8,549,506 B2
(45) Date of Patent: Oct. 1, 2013

(54) RESUMABLE METHODS

(75) Inventors: Henricus Johannes Maria Meijer, Mercer Island, WA (US); Mads Torgersen, Issaquah, WA (US); Neal M. Gafter, San Jose, CA (US); Niklas Gustafsson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 12/767,811

(22) Filed: Apr. 27, 2010

(65) Prior Publication Data

US 2011/0265070 A1 Oct. 27, 2011

(51) Int. Cl.
 *G06F 9/45* (2006.01)
(52) U.S. Cl.
 USPC .......................................... 717/159
(58) Field of Classification Search
 USPC .......................................... 717/159
 See application file for complete search history.

(56) References Cited

U.S. PATENT DOCUMENTS

| 5,301,331 | A | 4/1994 | Ueno et al. |
| 5,625,821 | A | 4/1997 | Record et al. |
| 5,987,495 | A | 11/1999 | Ault et al. |
| 5,999,987 | A | 12/1999 | O'Farrell et al. |
| 6,308,318 | B2 | 10/2001 | Krishnaswamy |
| 6,622,301 | B1 | 9/2003 | Hirooka et al. |
| 7,162,718 | B1 | 1/2007 | Brown et al. |
| 7,765,532 | B2 | 7/2010 | Dutt et al. |
| 8,321,842 | B2 * | 11/2012 | Xu et al. ................. 717/127 |
| 8,402,503 | B2 * | 3/2013 | Malik ................. 725/135 |

| 2002/0166000 | A1 | 11/2002 | Rossi et al. |
| 2005/0246692 | A1 | 11/2005 | Poteryakhin et al. |
| 2008/0034355 | A1 * | 2/2008 | Shen et al. ................ 717/148 |
| 2008/0163188 | A1 * | 7/2008 | Siskind et al. ............. 717/168 |
| 2008/0168438 | A1 * | 7/2008 | Meijer et al. ................ 718/1 |
| 2010/0005466 | A1 | 1/2010 | MacFarlane et al. |
| 2010/0313184 | A1 * | 12/2010 | Gustafsson et al. ......... 717/116 |

FOREIGN PATENT DOCUMENTS

KR  1020080093108 A  10/2008

OTHER PUBLICATIONS

Pedersen et al. "Resumable Java Bytecode—Process Mobility for the JVM", 2009, University of Nevada.*
Marlowe et al. "Schedulability-Analyzable Exception Handling for Fault-Tolerant Real-Time Languages", 1994, Kluwer Academic.*
Ducasse et al. "Seaside: A Flexible Environment for Building Dynamic Web Applications", 2007, IEEE.*

(Continued)

*Primary Examiner* — Anna Deng
*Assistant Examiner* — Junchun Wu

(57) ABSTRACT

APIs are provided, that are external to a programming language but that provide functionality that can be plugged into a language compiler. The provided APIs tailor functionality associated with asynchronous programming, iterators or writing symmetric co-routines using a generalized pattern-based approach. Several types of resumable methods are provided in the APIs which can be applied to method bodies written in traditional program code. Syntactically distinguishable control points in method bodies written in traditional program code invoke transformation of the code by the compiler using the external APIs. The transformed code enables the pausing and resumption of the code sandwiched between control points in the transformed code. The source code contained within a method having control points in it is transformed so that code within the method can be executed in discrete parts, each part starting and ending at a control point in the transformed code.

17 Claims, 9 Drawing Sheets

(56) References Cited

OTHER PUBLICATIONS

Toub., "Implementing the Asynchronous Programming Model with Future<T>", Retrieved at << http://blogs.msdn.com/pfxteam/archive/2008/02/29/7960146.aspx >>, Feb. 29, 2008, pp. 7.

Govindarajan, R., "Exception Handlers in Functional Programming Language", Retrieved at << http://scilib.kiev.ua/ieee/tse/1993/08/e8/e0826.pdf >>, IEEE Transactions on Software Engineering, vol. 19, No. 8, Aug. 1993, pp. 826-834.

Charles., "Jeffrey Richter and his AsyncEnumerator", Retrieved at << http://channel9.msdn.com/posts/Charles/Jeffrey-Richter-and-his-AsyncEnumerator/ >>, Dec. 3, 2008, pp. 3.

Haller, et al., "Actors that Unify Threads and Events", Retrieved at << http://www.ist-palcom.org/publications/files/haller07actorsunify.pdf >>, In Proceedings COORDINATION, 2007, pp. 1-17.

Waters, John K., "Microsoft's New .NET Rx Framework Tackles Challenges of Asynchronous Programming", Retrieved at << http://reddevnews.com/articles/2009/08/10/new-microsoft-framework-tackles-challenges-of-asynchronous-programming.aspx >>, Aug. 10, 2009, pp. 2.

"Oracle Complex Event Processing: Lightweight Modular Application Event Stream Processing in the Real World", Retrieved at << http://www.oracle.com/technology/products/event-driven-architecture/pdf/complex-event-processing-whitepaper.pdf >>, Jun. 2009, pp. 25.

"International Search Report", Mailed Date: Dec. 27, 2011, Application No. PCT/US2011/034006, Filed Date: Apr. 26, 2011, pp. 9.

\* cited by examiner

```
abstract class Resumable
{
public bool IsDone = false;
public Resumable Child;
public abstract void Invoke();
}
```

FIG. 2a

```
abstract class AsyncResumable : Resumable
{
public Action Resume; // To use in callbacks at the leaves public void Run() { Resume = ResumeFromTop; } public void ResumeFromTop() { Invoke(); }
public TAsync BeforeYield<TAsync>(TAsync async)
where TAsync : AsyncResumable {
        sync.Resume = this.Resume;
return async;
    }                                          212 public void AfterYield(Async async) { }
public T AfterYield<T>(Async<T> async) {
return async.Result;
    }
}                                              214
```

FIG. 2b

```
abstract class Async : AsyncResumable
    {
    public void BeforeReturn() { }
    }                              222
```

FIG. 2c

```
abstract class Async<T> : AsyncResumable        230
{
public T Result;
┌─────────────────────────────────────────┐
│ Publicvoid BeforeReturn (T value) { Result = value;} │
│ }                                    232│
└─────────────────────────────────────────┘
```

FIG. 2d

```
                                            240
Static Async<int> M() — 242
    {
Console.WriteLine("before");
Int x = yield Wait(10); — 244
Console.WriteLine("After");
Return x;
    }
```

FIG. 2e

```
                                            250
public class_Mframe : Async<int>
    {
public override void Invoke() { — 251
Console.WriteLine("before");

int x;
var _tmp1 = Wait(10); — 252
var _tmp2 = BeforeYield(_tmp1); — 253
        CALL(_tmp2); — 254
var _tmp3 = AfterYield(_tmp2); — 255
        x = _tmp3; — 256

Console.WriteLine("after");
        BeforeReturn(x); — 258
return; — 259
        }
    }
```

FIG. 2f

```
static Async<int> M()                    260
{
return new_Mframe();
}
```

FIG. 2g

```
abstract class Iterator : Resumable, IEnumerator    270
{
public Enumerator TopState topIterator = new Enumerator TopState();

public object Current
        {
get { return topIterator.Current; }
        }
public bool MoveNext()
        {
                Invoke();
return !IsDone;
        }
void IEnumerator.Reset() { throw new Exception(); } public object BeforeYieldReturn(object o) { topIterator.Current = o; return null; }
public void AfterYieldReturn(object o) { }                                          } 272 public Iterator BeforeYieldForeach(Iterator enumerator)
        {
                enumerator.topIterator = this.topIterator;
return enumerator;                                        } 274
        } public Iterator BeforeYieldForeach(IEnumerator enumerator)
        {
var resumable = enumerator asIterator;
If (resumable == null)
        {                                                         } 276
                resumable = newWrappingIterator(enumerator);
        } return BeforeYieldForeach(resumable);
        }
```

FIG. 2h

```
public Iterator BeforeYieldForeach(Ienumerable enumerable)
    {
return BeforeYieldForeach(enumerable.GetEnumerator());
    } public void AfterYieldForeach(Iterator enumerator) { } public void BeforeYieldBreak() { } class WrappingIterator : Iterator
    {
IEnumerator enumerator;

public WrappingIterator(IEnumerator enumerator) { this.enumerator = enumerator; } public override void Invoke()
        {
while (enumerator.MoveNext())
            {
                topIterator.Current = enumerator.Current;
this.PAUSE();
            }
        }
    }
}
```

```
Static Iterator F()
    {
yield return 1;    —282
yield foreachF();  —284
yieldreturn 2;
yieldbreak;
        }
```

FIG. 2i

```
public class_Fframe : Iterator
    {
public override void Invoke()
        {
var _x1 = this.BeforeYieldReturn(1);   —292
this.PAUSE();—294
this.AfterYieldReturn(_x1);   —296 var _x2 = this.BeforeYieldForeach(F());
this.CALL(_x2);
this.AfterYieldForeach(_x2);

var _x3 = this.BeforeYieldReturn(2);
this.PAUSE();
this.AfterYieldReturn(_x3);

BeforeYieldBreak();
return;
            }
```

298 (brace for x2 block)

FIG. 2j

RESUMABLE METHODS

BACKGROUND

A multi-core processor is a processing system that includes two or more individual processors (cores). A many-core processor is a processor in which the number of cores is large enough so that traditional multi-processor programming techniques are no longer efficient.

Programmers who develop software for many-core processors have to adapt the way they write their programs. That is, in order to write efficient programs for these types of computing environments, programmers have to write asynchronous code, code that can be executed concurrently with other code without interfering with it. Writing non-blocking asynchronous code without language support is difficult because programmers have to write code in continuation passing style (CPS), for example, through the use of callback-based code. Things that are implicit in traditional synchronous programming are made explicit in CPS programming. For example, in traditional coding, when a function is called, it returns a value. In CPS a function takes an explicit continuation argument, a function that receives the result of the computation performed within the original function. Similarly, when a subroutine is invoked within a CPS function the calling function has to supply a procedure to be invoked with the subroutine return value.

Some languages, such as C# for instance, do provide a form of compiler supported continuation passing rewrite by way of an iterator construct. This type of language support is not particularly optimal for recursion and for other types of coding techniques needed for asynchronous programming.

SUMMARY

While built-in language support for iterators may help to solve some problems associated with lazily evaluated collections and while built-in language support for asynchronous programming does exist to some extent in some languages, the subject matter disclosed herein is directed to a unified approach that abstracts out specifics of various aspects of these areas and provides a general external mechanism that can address numerous issues associated with asynchronous processing, producing a collection lazily via iterators, writing symmetric co-routines and so on.

APIs (program modules) are provided, that are external to a programming language but that provide functionality that can be plugged into the language compiler. The provided APIs tailor functionality associated with asynchronous programming, iterators or writing symmetric co-routines using a generalized pattern-based approach. Several types of resumable methods are provided in the APIs which can be applied to method bodies written in traditional program code. Syntactically distinguishable control points in method bodies written in traditional program code invoke transformation of the code by the compiler using the external APIs. The transformed code enables the pausing and resumption of the code sandwiched between control points in the transformed code. That is, the source code contained within a body of code (e.g., a method) having control points in it is transformed so that code within the method can be executed in discrete parts, each part starting and ending at a control point in the transformed code.

Wherever a control point is located in the code, the code can be paused either directly or as part of a recursive call that pauses. The code can be resumed from the point at which it was paused. Different types of resumable methods are distinguished by how and when the method is resumed after pausing, and by the types of arguments and return values that flow back and forth when the code pauses, resumes or terminates. A pausing control point can optionally return a value to a caller, and can receive a value from a resuming module using a yield expression. A recursive call control point can recursively apply a compatible resumable method, pausing as determined by that method using a yield or yield-for-each expression. A return control point signals termination of the resumable method with or without a result value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIGS. 2a-2d are examples of driver classes in accordance with aspects of the subject matter disclosed herein;

FIG. 2e is an example of source code in accordance with aspects of the subject matter disclosed herein;

FIG. 2f is an example of transformed source code in accordance with aspects of the subject matter disclosed herein;

FIG. 2g is an example of a rewritten method in accordance with aspects of the subject matter disclosed herein;

FIGS. 2h-j are examples of resumable methods implementing iterators in accordance with aspects of the subject matter disclosed herein;

DETAILED DESCRIPTION

Overview

The subject matter disclosed herein describes a contract between a feature of a language compiler and pattern-based application programming interface (API) plug-ins to the compiler. The API plug-ins tailor the feature to asynchronous programming, to iterators, to symmetric co-routines, and so on, providing the compiler with the details of what to do for each particular type of resumable method. The feature restructures the output code (e.g., intermediate code) removing the one-to-one correspondence between source code and output code. The source code that includes one or more control points is transformed so that the output code can be executed in discrete parts, each part starting and ending at a control point in the transformed output code. For example, an end user may write traditional, synchronous code until he gets to a point where he would like his code to be able to pause to wait for something without halting all processing. At this point, the end user can insert a control point anywhere in his code, including at a point deeply nested within a control structure of the language. Recognition of input of a control point by a compiler triggers compiler transformation of the API identified by the form (signature) of the control point expression in the source code. The called API determines validity of the language syntax in the source code and can expose an asynchronous programming specific version of an interaction with a language feature of the compiler if a background compiler is in use.

Using External APIs to Extend a Compiler to Implement Resumable Methods

Figure 1:
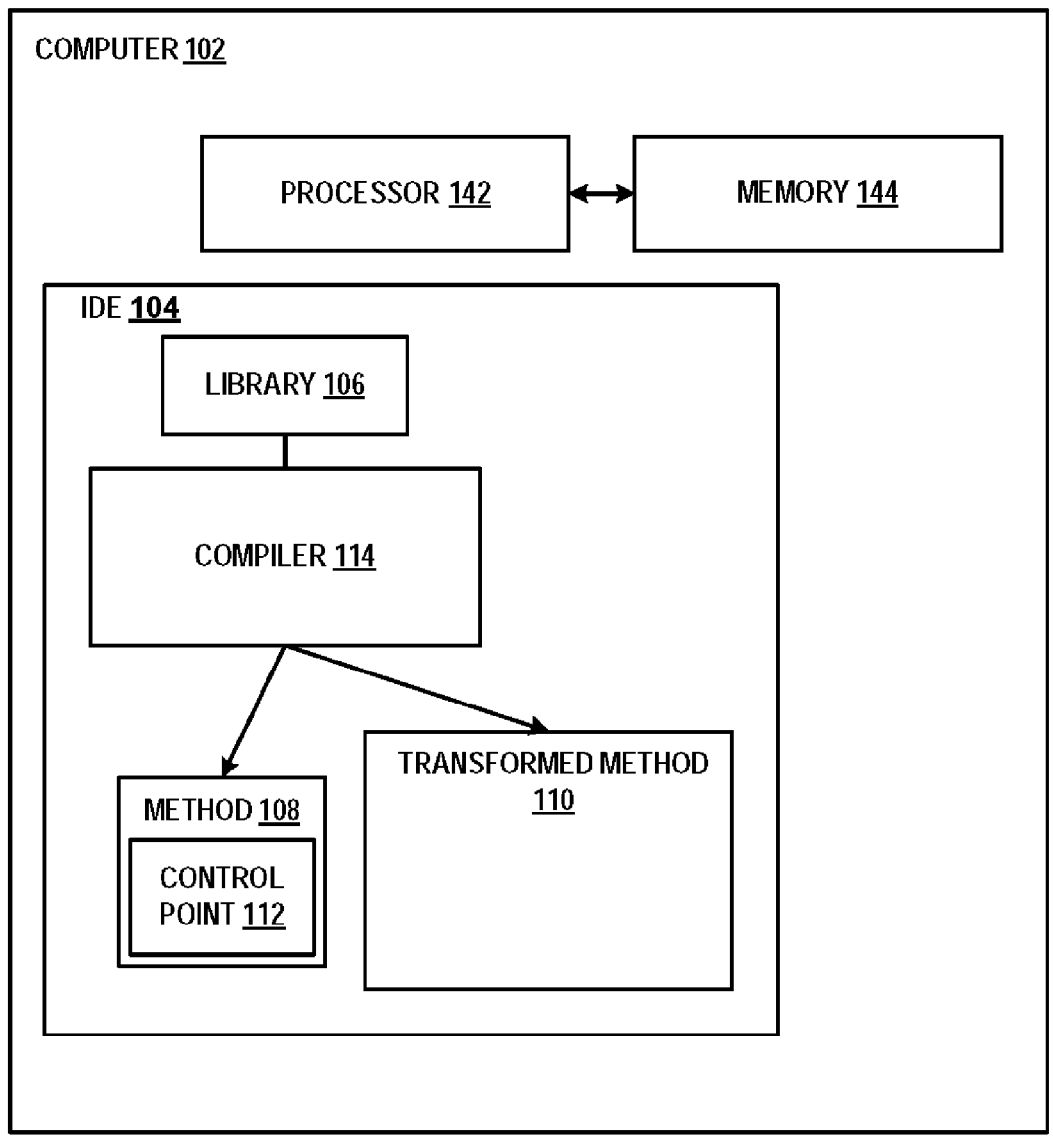
FIG. 1 illustrates an example of a system 100 that provides a mechanism that is external to a programming language for resumable methods in accordance with aspects of the subject matter disclosed herein.

FIG. 1 illustrates an example of a system 100 that provides a mechanism that is external to a language compiler to implement resumable methods in accordance with aspects of the subject matter disclosed herein. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (e.g., IDE 104) such as the ones described and illustrated below with respect to FIG. 4. Alternatively, system 100 or portions thereof may be provided as a stand-alone system or as a plug-in or add-in.

System 100 may include one or more of: a processor (such as processor 142), a memory 144, and a library 106 for APIs or modules that provide a mechanism to implement resumable methods. Other components well known in the arts may also be included but are not here shown. It will be appreciated that one or more modules of library 106 can be loaded into memory 144 to cause one or more processors such as processor 142 to perform the actions attributed to the APIs that provide a mechanism to implement resumable methods that is external to a programming language and can be plugged into a language compiler.

System 100 can include one or more of the following: a compiler 114 such as a background compiler, a parallel compiler or an incremental compiler, a parser such as a background parser, parallel parser or incremental parser or a plug-in, a pre-processor, or an add-in or extension to an IDE, parser, compiler or pre-processor. The APIs described herein may be attached to, incorporated within or associated with a compiler such as a background compiler, a parallel compiler or an incremental compiler, a parser such as a background parser, parallel parser or incremental parser or a plug-in, a pre-processor, or an add-in or extension to an IDE, parser, compiler or pre-processor. Compiler 114 may include one or more modules that interact with the purpose-specific APIs.

Particular kinds of purpose-specific resumable methods, such as but not limited to asynchronous or iterator methods are provided in a library that is external to a language compiler. An application programmer can cause these methods to be applied to method bodies containing traditional programming code by adding to the traditional code one or more syntactically distinguishable control points in the method bodies. The input source code including a method 108 that includes such a control point 112 can be transformed by the compiler 114 using an API from the library 106 to generate an extended method such as transformed method 110, that enables the transformed method 110, when executed, to be performed in discrete parts sandwiched between control points, as described more fully below. A control point is a point at which the body of code in the method can be paused, either directly or because the method is part of a recursive method call that pauses. The different kinds of resumable methods differ by how and when the method is resumed after pausing, and by which arguments and return values flow back and forth on pausing, returning and terminating. A yield expression can optionally return a value to a caller, and receive a value from a resumer or resuming module for a pausing control point. A yield or yieldforeach expression can recursively apply a compatible resumable method pausing as determined by that method for a recursive control point. A return statement signals termination of the resumable method with or without a final result value for a return control point.

The different kinds of resumable methods differ by how and when the method is resumed after pausing, and by which arguments and return values flow back and forth on pausing, returning and terminating. A yield return expression can optionally return a value to a caller, and receive a value from a resumer or resuming module for a pausing control point. A yield or yieldforeach expression can recursively apply a compatible resumable method pausing as determined by that method for a recursive control point. A return statement signals termination of the resumable method with or without a final result value for a return control point. Active resumable methods can be represented by a frame object of a type deriving from a class of resumable methods such as class Resumable. The object represents the stack frame of the method when the method is suspended. When a method is suspended, the stack frame representing the suspended method can be copied to another data structure and can be removed from the machine stack. Therefore, a suspended method may not physically reside on a stack. Alternately, the whole state of the stack can be saved, maintaining it on the heap whether the method is active or suspended.

In a traditional, nonresumable control flow, the machine uses a single thread of execution to execute a contiguous stack of the methods that are currently waiting for execution. Each method on the stack is waiting for another method to return to it. The stack typically cannot be accessed directly by the compiler. In some environments that enable resumable methods, a resumable method is paused when a particular statement is encountered. At this point, in accordance with aspects of the subject matter disclosed herein, the frames of the stack for the paused method can be saved and put back on the stack when the method resumes. Information about what resumable method called which resumable methods is stored in a separate data structure so that when a method returns, the return can be directed to the correct recipient as specified by the responsible driver class. That is, each instance of the driver class (i.e., each purpose specific object) represents a method call in the saved representation of the machine stack. An object instantiated from a particular driver class represents a particular resumable method call under execution. A collection of purpose specific objects represent the chain of control formerly maintained by the stack. A method call under execution is any method call that is currently running or has been paused and has not yet ended. When a resumable method returns a result, it gives the result to the method that called it and the calling method resumes.

In accordance with some aspects of the subject matter disclosed herein, the compiler generates the code that causes the transfer of control to the resumed method, transforming the input source code. When a resumable method is resumed, an Invoke method or other invoking method on the frame object can be called, that places a real activation record for the resumed method back on the machine stack. If a paused method (first resumable method) is waiting recursively for another suspended resumable method (a second resumable method), the frame object for the second method can similarly resumed, so that the machine stack represents the actual calling order of the resumable methods. Thus, exception propagation, debugging, etc., can naturally build on the corresponding built-in mechanisms such as but not limited to CLR mechanisms for exception propagation and debugging. Other mechanisms for stack handling are also possible.

Different kinds of resumable methods can be defined by driver classes deriving from an abstract resumable base class. FIG. 2a illustrates an example of such an abstract base class Resumable 200. Particular resumable methods can be generated by the compiler as derived classes from these driver classes, implementing the pausing logic as a state machine.

The state machine rewriting of resumable methods can be thought of as occurring in two phases. The first phase can put the method body into an override of an invocation method in a compiler generated class deriving from the driver in which any occurrence of a control point is rewritten into one of:

a) a call to a "before" method in the driver class with any arguments passed to the control point b) an invocation of a particular specialized command for further rewriting c) a call to an "after" method in the driver class passing any resulting value to the context the control point occurred in In the second phase, the compiler generated class and Invoke method can be augmented with state machine logic, and the specialized commands can be rewritten into code for state transformation and suspension.

An example of how the language features and the library APIs can interact using driver classes is described below. Driver classes, in accordance with some aspects of the subject matter disclosed herein implement the purpose specific parts external to the programming language. A pausing control point can be used to pause the execution of a method. Suppose that a particular method expresses a body of work that is to be performed gradually over time. To make the method resumable, a pause control point can be inserted in the method body. If for example, elements of a collection are being produced, a pause control point can be inserted at the point at which the computation that generates the next element has been performed. At this point, an element can be yield returned. When the next element of the collection is requested, the method can be resumed and can resume at the point from which the yield return was made.

A recursive control point pauses a method that places a recursive call whenever the called method pauses. For example suppose a first iterator can yield 3 elements (one at a time) and a second iterator can yield 2 elements (one at a time), the two iterators can be composed into an iterator that can yield all 5 elements in sequence by creating a resumable method that can call other resumable methods. The composed iterator method can first call the first iterator and have it yield its three elements one at a time. When the first iterator has yielded out all three elements, the composed method can call the second iterator that yields out the other two elements. When the first iterator pauses, the composed iterator method is paused. Similarly, when the second iterator pauses, the composed iterator method is paused. A returning control point signals termination of the resumable method and is used to define what to do when the work is complete. Although several pauses and several resumptions may have occurred along the way, eventually the work is complete. A return may only indicate that the work is done or it may also include the results of the work that was done.

An asynchronous method can be used whenever latency periods are long, as for example during input output operations or for communication over a network. Suppose for example, that a user wants to download some information from a web page, perform some computation on the downloaded information and send the computational result to another web page. When the operations described are complete, a Boolean result indicating success or failure is to be returned. To perform these operations synchronously, typically a method that calls two helper methods is used. One of the helper methods typically navigates to the website and extracts the desired content. After the content is received, the computation is performed. The second helper method typically is called to send the computational result to the other web page. When complete, the method returns the Boolean result. Synchronous processing in this case results in periods of wait time, especially while the connection is made to the web page and the downloaded information is retrieved and again while the computational result is sent to the second web page. Depending on the connection rate, network traffic, and size of the downloaded information, wait time can be significant.

Performing this series of actions using asynchronous methods frees up operating system thread resources, which can lead to a better user experience. For example, in any GUI-based application, only a single thread services user input events, so that failure to free up the thread can lead to a very poor user experience. Implementing an asynchronous method without language support however is difficult because normal control structures cannot be used. Therefore, the programmer has to manually write and debug nested callbacks, a difficult and error prone task resulting in code that is also difficult to read and maintain. Moreover, complexity of the code grows rapidly as the number of "manually" (non-programmatically) transformed control points within a method grows. In accordance with aspects of the subject matter disclosed herein, control points can be placed inside normal control structures, to any depth of nesting. Recursive calls can be made inside an asynchronous method that is supported by an asynchronous driver class. Callbacks are generated by the compiler, where the callbacks resume the method but are transparent to the developer. In the example of downloading from the web page, an asynchronous method first yields to the method that reads from the web, the computation is performed, then a recursive yield is made to the method that sends the computational result to the second web page and finally the Boolean result is returned. Hence the flow of control is the same as with the synchronous method but the processor is never idle. Iterators work similarly except that the client triggers production of the next element of a collection instead of a callback from the web page triggering the next step. Different sets of circumstances drive the different processes described by specifics of the driver class.

Hence, the different types of control points described above, enable the composition of a resumable method that is composed like a traditional method without the developer having to deal with the complexities of resumable methods. Resumable methods can be composed by calling other asynchronous or resumable methods or by the method recursively calling itself. While in general an iterator can call other iterators and an asynchronous method can call other asynchronous methods, in accordance with aspects of the subject matter disclosed herein, the driver classes specify what kind of resumable methods can be called from a particular resumable method so that a resumable method is not limited to calling another resumable method of the same type.

As described above, purpose-specific objects representing the chain of control of execution (e.g., the stack) can be generated by the compiler from purpose specific abstract base classes. The purpose specific abstract base classes include purpose specific behavior and methods. For example, an abstract class Asynch<T> (illustrated in FIG. 2d) can be used by the compiler to make a derived class that includes the specific method body of the Asynch<T> class. The derived Asynch<T> class is instantiated into a frame object. Part of the code in the frame object can be contributed by the purpose specific base class which came from the library and part of it can be contributed by the compiler which can put in the logic that is specific to the method. In the transformed or expanded version of the method there will be calls to the purpose specific methods that were inherited from the base class. An alternative to the above involves the creation of two objects, one object created by the compiler comprising a core frame object and one object provided by the library wherein the objects communicate with each other through their methods.

In accordance with aspects of the subject matter disclosed herein, at each control point the compiler generated code can call a method on the driver class before the method is paused and can call a method on the driver class after the method is resumed to give the method an opportunity to perform its purpose specific behavior. For example, for the yield control point there is a before yield method and an after yield method that the compiler generated code will call on the base class. For a recursive call that returns there is a before yield return method and an after yield return method and for the return there is a before return method but no after return method because a method returns when it is done. The before and after method calls enable the driver class to specify the method to be performed. If the driver class does not specify a before yield or after yield method, the compiler cannot generate method calls to them so that using this kind of control point will be illegal in resumable methods that are governed by this driver class. Hence, the driver class can specify which of the control points are available by specifying the before and after methods or by failing to specify the before and after methods.

In addition to determining whether a particular control point is available, the driver class can determine for which situations the control point is available. Because the interaction is pattern-based, and the pattern determines which method the compiler generated code calls, by specifying which argument types the method takes, the driver class can specify which methods can be called recursively. Multiple overloads of the method can exist so that, for example, an asynchronous method can be allowed to call multiple types of asynchronous methods, which can enable interoperation between different models. Similarly, specification of argument typing can be used to call methods that are represented by the task class that is currently in the library.

Finally, the driver class can determine what is in the body of the method, that is, what the driver specific behavior before the yield is. For example, some data may be transferred between the frame classes or processing may be performed to make data representations ready for resumption. With respect to iterators, the before yield return method call can specify how the next element value of the collection is yielded, and how to transfer the value to the client. The before and after methods are open ended and can be used to implement iterators, asynchronous methods and variations thereon. For example, various asynchronous methods can be represented by parameterized driver classes that can be created by end users for any imperative programming language.

FIGS. 2a-2d illustrate non-limiting examples of driver classes that implement the above. It will be appreciated that although the examples provided use a particular syntactic form that identifies methods by name, other syntactic forms not limited to named methods could be used. FIG. 2a illustrates an example of a system wide base class for resumable methods (class Resumable 200) from which service specific driver classes can derive. FIG. 2b illustrates an example of an abstract class AsyncResumable 210 that derives from class Resumable 200 and that is specific to asynchrony. Two variants of abstract class AsyncResumable 210 are illustrated in FIGS. 2c and 2d. Class Async 220 that derives from abstract class AsyncResumable 210 and class Async<T> 230 that also derives from abstract class AsyncResumable 210. Class Async 220 is used to create objects that represent asynchronous operations that do not have a result. Class Async<T> 230 is a generic class used to create objects that represent asynchronous operations that have a result of type T.

The body of AsyncResumable 210 includes the BeforeYield method 212 and the AfterYield method 214. The signatures of the before methods (e.g., BeforeYield method 212) and the after methods (e.g., AfterYield method 214) describes the type of methods that can be recursively called and assures that return values are produced and consumed correctly. When types of before return methods are missing in a class definition, it is not legal to call that kind of return (e.g., the lack of a BeforeYieldReturn method in the definition of class Async 220 and in the definition of class Async<T> means it is not legal to call YieldReturn in these asynchronous methods.) The presence of the BeforeYield and AfterYield methods in the class definition of AsyncResumable 210 indicates that a yield is possible from an AsyncResumable method. Because of the absence of a BeforeYieldReturn method and AfterYieldReturn yield return control points cannot be used in an AsyncResumable method. Other asynchronous methods can be yielded, methods other than asynchronous methods cannot be yielded.

The definition of the classes Async 220 and Async<T> 230 include other return methods. The BeforeReturn method 222 of class Asynch 220 indicates that a return can only be made without a result value, therefore it takes no argument. The BeforeReturn method 232 of class Asynch<T> 230 indicates that the method returns a value of type T, therefore the BeforeReturn method 232 takes an argument of type T. Thus, if "return 7" is included in the body of a resumable method that returns Async<int>, the compiler generated calls to BeforeReturn with an argument of 7 will resolve to the BeforeReturn method 232 without problems. If, however, a method tried to return a string to an Async<int> method, the compiler would discover that the signature did not match and would return a compile-time error.

FIG. 2e illustrates an example of a snippet of code comprising an asynchronous, resumable method 240 as an end user may write it. The method can be determined to be asynchronous by the statement static Async<int> M( )" 242 that returns Async<int>, one of the driver classes described above. Inside the resumable method 240 is normal control flow code that writes "before" to the console and then yields x (int x=yield Wait(10); statement 244). The control point of this line of code is the "yield" expression, which triggers the translation of method 240 to method 250 illustrated in FIG. 2f. The method 250 is rewritten to produce an instance of the MFrame class as illustrated in FIG. 2g method 260. The compiler generates a derived class from Async<int> called MFrame and expands the occurrences of yield and return as illustrated in FIG. 2f. It will be appreciated that expanded method 250 overrides the invoked method (public override void Invoke( ){} statement 251 and now has the code written by the user and additional code generated by the compiler in it. The Console.WriteLine("before") and Console.WriteLine ("after") statements are still there but between these two statements the int x=yield Wait(10) statement 244 of method 240 has been expanded into code that calls Wait(10) statement 252 and then calls BeforeYield statement 253.

The result of calling BeforeYield is that the execution of the method pauses, indicated by "CALL" in the line CALL (_tmp2); statement 254. The occurrences of "CALL" and "return" in the body of the invocation method signal to the compiler that state machine control code has to be inserted at these points. The calls to the Before and After methods are generated from the syntax of the original source code. The compiler can check the calls against the methods provided in Async<T> using method binding rules and techniques, and raises an error if the methods are not correctly used. Hence, recursive invocations are fully strongly typed. When the method resumes, the method AfterYield is called (in the line var_tmp3=AfterYield(_tmp2); statement 255. The result of calling AfterYield will be put into the variable tmp3. The contents of the tmp3 variable is assigned to the variable x by the user-written code: x=_tmp3; statement 256, "after" is written to the console, statement 259, x is returned by calling BeforeReturn(x); statement 258 and the return line statement 259 is executed.

FIGS. 2h-j illustrate examples of resumable methods implementing iterators. The driver class 270 illustrated in FIG. 2h declares an abstract class called Iterator that is derived from the abstract class Resumable and that implements the IEnumerator interface (abstract class Iterator; Resumable, IEnumerator) The IEnumerator interface has a method called MoveNext which moves to the next element in the collection. The IEnumerator interface also has a Current property in which is stored the value of the current element in the collection (the one MoveNext moved to). Whenever the MoveNext method is called on Iterator, the next part of the method having the control points in it can be executed. The driver class 270 supplies "Before" and "After" methods for YieldReturn, YieldForeach and YieldBreak (return) that are different than the analogous methods for the Async class. A number of overloads of YieldForeach in the example demonstrate the power of this methodology. For example, one overloaded YieldForeach gets the enumerator from an enumerable, transforms it into an iterator and invokes it recursively. The "PAUSE" command can be used to rewrite the YieldReturn control point.

FIG. 2i illustrates a simple iterator, a static iterator F 280. Iterator F 280 includes a control point, a yield return statement ("yield return 1;" statement 282) that directly produces an element of the collection and then pauses. Iterator F 280 also includes the control point "yield foreachF( );" statement 284 that recursively calls the interator F until F runs out of elements in the collection. Hence, multiple values can be yielded, with pauses in between yields. The statement "yield return 2;" statement 286 returns another value. The "yield break;" statement 288 is executed when all of the elements of the collection have been yielded.

Iterator F 280 can be translated by the compiler, as illustrated in FIG. 2j. As can be seen in FIG. 2j, each of the control points in Iterator F( ) can be translated into calls to "Before" and "After" methods (e.g., the statement "yield return 1" as illustrated in FIG. 2j statement 282 is transformed into calls to BeforeYieldReturn(1), as illustrated in FIG. 2j, statement 292, to PAUSE, as illustrated in statement 294, and to AfterYieldReturn as illustrated in statement 296. Similarly the YieldForeachF( ) statement 284 is translated into a BeforeYieldForeach statement, a CALL statement and an AfterYieldForeach statement as illustrated in the three statements 298 in FIG. 2j. When iterator F 280 is executed, a yield return with a value is returned (statement 292), the PAUSE statement 294 causes the method to suspend executing and when the method is resumed, the method will call the AfterYieldReturn method as illustrated in statement 296. BeforeYieldReturn inherits from the Iterator class, as illustrated in FIG. 2h statement 272, setting the current value to object o so that when the call to MoveNext completes, the current value will be returned.

The statements illustrated in the three statements 298 operate similarly for the YieldForeach control point of statement 284 for recursive calls and comes in three overloads, overload 274, overload 276 and overload 278. The three different overloads allow different YieldForeach methods to take different arguments and enabling yielding through different representations of collections. The first overload, overload 274 recursively calls another iterator. For the second overload, overload 276, Enumerable represents the collection of objects and has a method called GetEnumerator. When GetEnumerator is called, a new element of the collection is obtained. When the end of the collection is reached, no more elements can be obtained. The last overload, overload 278 enables a new instance of the collection to be obtained.

The final transformation of the invocation methods into state machines is analogous to that of iterators and asynchronous methods, as described herein. Each PAUSE and CALL is assigned a state. Logic is added at the beginning of the method and at the beginning of every try block to branch to the point in the code associated with the current state. A PAUSE point pauses or suspends execution of the method and advances the state to right after the PAUSE and returns. Later resumption will re-invoke the invocation method, branching to the point right after the PAUSE command. A CALL point does not suspend execution. Instead it starts executing on the called resumable method. The called resumable method may include a control point such as a PAUSE so that the called resumable method may itself be paused or suspended, causing the whole stack to be paused (including the calling method).

By combining iterators and asynchronous methods, a user-defined driver class such as IAsyncEnumerator wherein an IEnumerator MoveNext method is asynchronous can be created. Such a combination method body can call recursively both to asynchronous methods and to synchronous iterators, enabling various additional control points. Symmetric co-routines can be implemented by creating collaborating methods that pass control to one another (instead of being returned to), while retaining execution state between each resumption. Collaborating methods, unlike some implementation of asynchronous methods, may not increase the depth of the call stack. Instead leaf frames of the call stack can be swapped out.

Figure 2K:
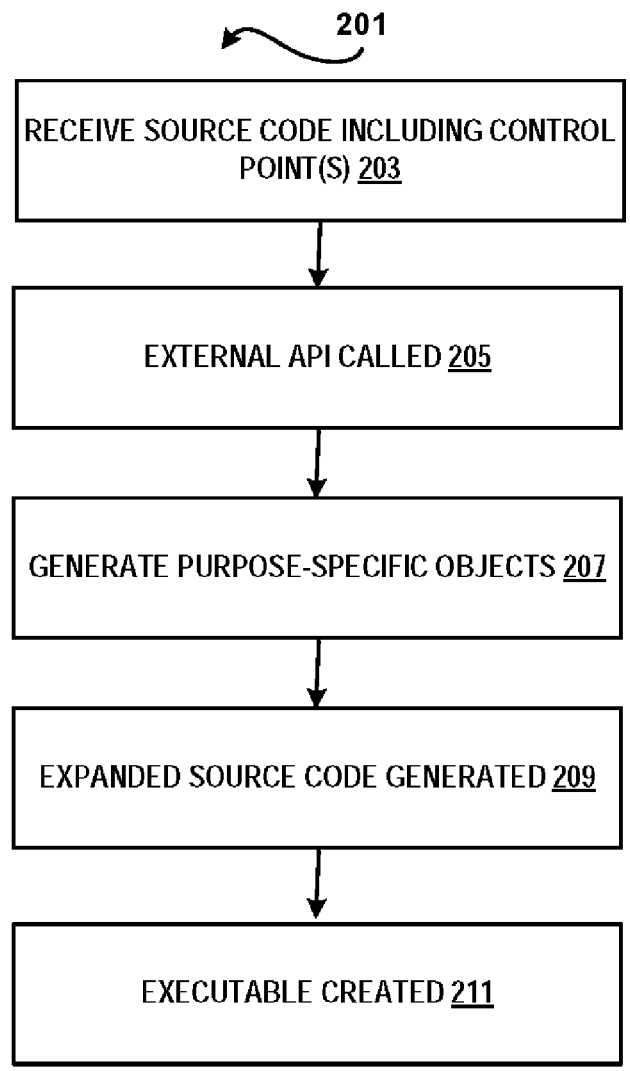
FIG. 2k is a flow diagram of an example of a method 201 for using external APIs to implement resumable methods in accordance with aspects of the subject matter disclosed herein.

FIG. 2k is an example of a method 201 for using external APIs to extend a compiler to implement resumable methods. At 203 source code can be received by the compiler. The compiler can be a compiler such as the ones described above with respect to FIG. 1. In response to recognizing syntactically distinguishable control points such as the pausing, recursive calling and returning control points described above, at 205, the compiler can call an external API determined by the signature of the control point expression. The called API can be a purpose-specific method and can reside in a library external to the compiler, as described above. At 207, purpose-specific objects representing the chain of control (e.g., the stack) can be generated by the compiler from purpose specific abstract base classes in the library. Alternatively, instead of calling an abstract base class, any code that complies with the signature of the control point expression can be called, including but not limited to a non-abstract base class, an interface, a static class with extension methods and so on. The purpose specific abstract base classes or other code can include purpose specific behavior and methods such as asynchronous and iterator methods. For example, an abstract class Asynch<T> (illustrated in FIG. 2b) can be used by the compiler to make a derived class that includes the specific method body of the Asynch<T> class.

The derived resumable class can be instantiated into an object such as, for example a frame object. Part of the code in the object can be contributed by the purpose specific base class from the library. Part of the code in the object can be contributed by the compiler which puts in the logic that is specific to the method. At 209 the received source code can be transformed into expanded source code such that at each control point in the received source code, compiler-generated code can call a method on the driver class before the method is paused and can call a method on the driver class after the method is resumed to give the method an opportunity to perform its purpose specific behavior. For example, compiler generated code can call a before yield method and an after yield method on the base class. For a recursive call that returns, compiler generated code can call a before yield return method and an after yield return method. Similarly for the return, compiler generated code can call a before return method but no after return method because a method returns when it is done. The before and after method calls enable the driver class to specify the method to be performed and thus what kinds of control point are legal in a particular resumable method and for which situations the control point is available. Because the interaction is pattern-based, and the pattern determines which method the compiler generated code calls, by specifying which argument types the method takes, the driver class can specify which methods can be called recursively. Multiple overloads of methods can exist so that, for example, an asynchronous method can be allowed to call multiple types of asynchronous methods, which can enable interoperation between different models. The driver class can determine the specific behavior associated with object. At 211 an executable can be created.

Example of a Suitable Computing Environment

Figure 3:
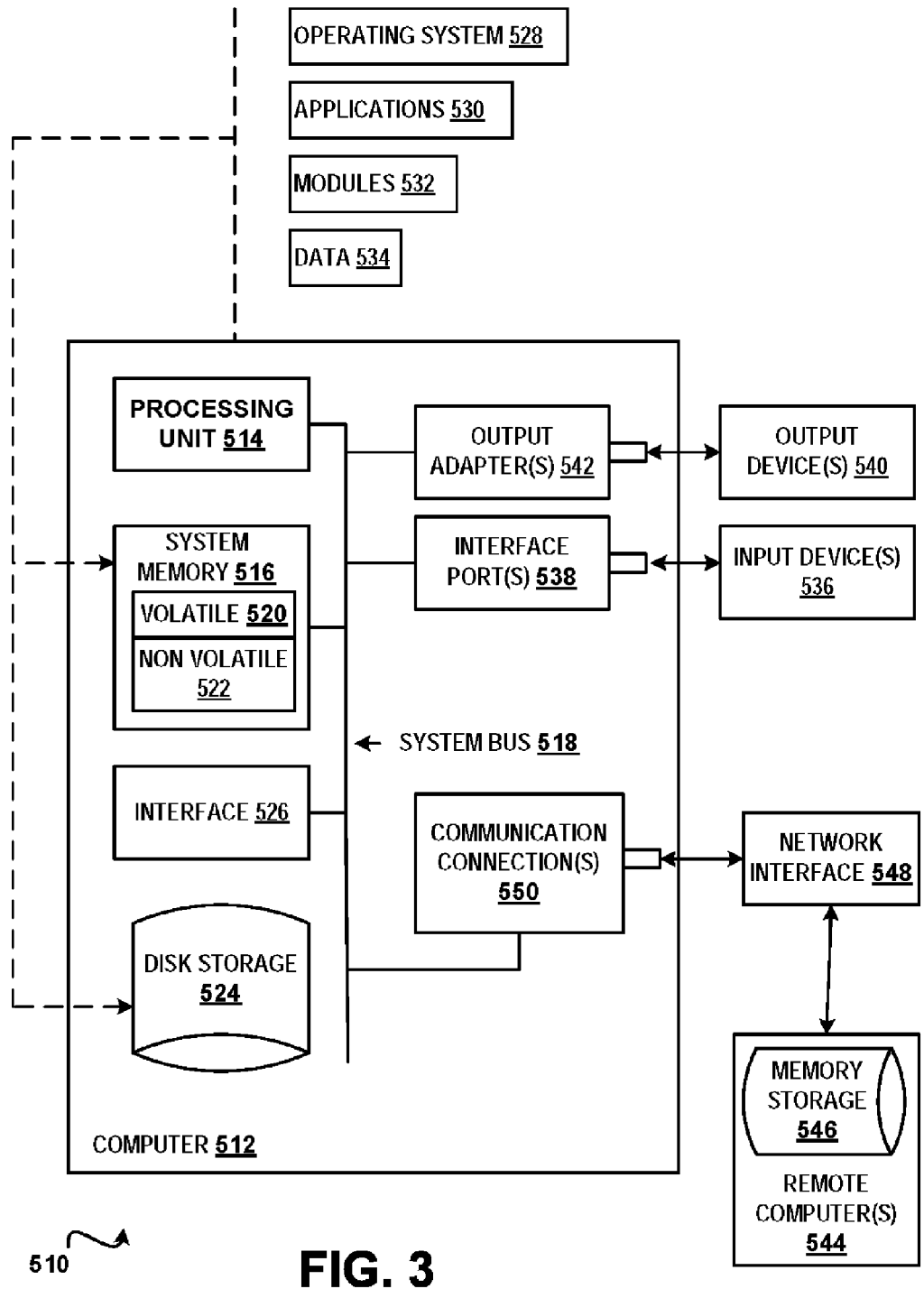
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
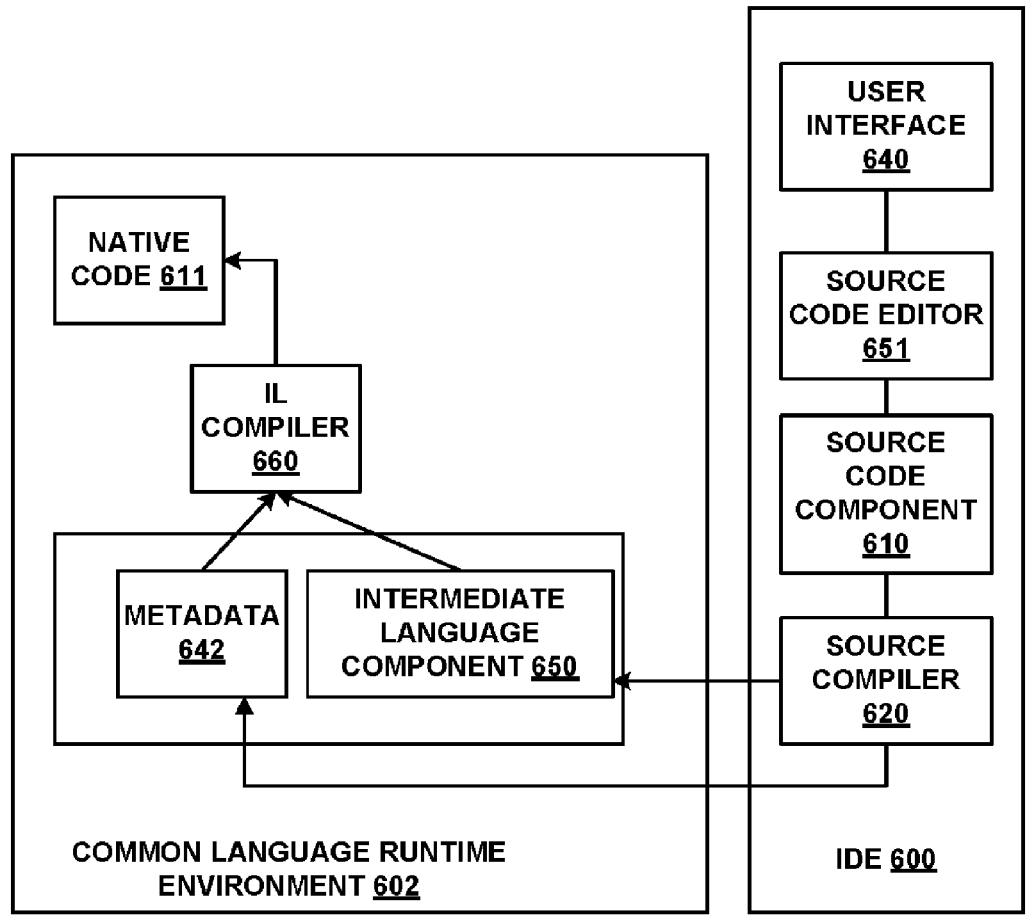
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising: a processor and a memory; and
a compiler configured to cause the processor to:
receive source code comprising a resumable method, the resumable method comprising a syntactically distinguishable control point expression having a signature, wherein the compiler calls a program module of a plurality of program modules, the called program module determined by the signature of the control point expression, wherein the compiler creates at least one purpose specific object from the called program module, wherein the compiler transforms the received source code into expanded source code, wherein the expanded source code includes callbacks to purpose specific methods inherited from the called program module, wherein the callbacks are inserted into the expanded output code by the compiler, the inserted callbacks comprising a call to a method that is executed before the resumable method is paused, and a call to a method that is executed after the resumable method is resumed; and load a library external to the compiler, wherein the library comprises the plurality of program modules.

2. The system of claim 1, wherein a plurality of purpose specific objects created by the compiler represent an execution chain of control.

3. The system of claim 1, wherein the purpose specific methods comprise resumable methods comprising asynchronous methods or iterator methods or symmetric co-routine methods.

4. The system of claim 1, wherein the compiler creates a derived class from a method body of the called program module.

5. The system of claim 4, wherein the derived class is augmented with state machine logic and specialized commands are rewritten into the derived class for state transformation and suspension.

6. The system of claim 1, wherein the called program module specifies available control points by specifying the method that is executed before the resumable method is paused and by specifying the method that is executed after the resumable method is resumed and wherein the called program module determines unavailable control points by failing to specify a method that is executed before the resumable method is paused and by failing to specify a method that is executed after the resumable method is resumed.

7. A method comprising:
receiving source code in a compiler on a software development computer, the source code comprising a resumable method, the resumable method comprising a syntactically distinguishable control point expression, wherein the compiler calls code based on a pattern-based interaction, the code in a library external to the compiler, the compiler deriving a purpose specific driver class from the code;

transforming the received source code into expanded output code, wherein the expanded output code includes callbacks to purpose specific methods inherited from a class that complies with the pattern of the pattern-based interaction, wherein the callbacks are inserted into the expanded source code by the compiler, the inserted callbacks comprising a call to a method that is executed before the resumable method is paused, and a call to a method that is executed after the resumable method is resumed; and instantiating an object from the derived purpose specific driver class, the object representing a resumable method comprising an asynchronous method or an iterator or a symmetric co-routine.

8. The method of claim 7, wherein the purpose specific driver class includes purpose specific behavior and purpose specific methods.

9. The method of claim 8, wherein multiple overloads of the purpose specific methods exist.

10. The method of claim 7, wherein the syntactically distinguishable control point expression is nested within a control structure of a programming language in which the source code is written.

11. The method of claim 7, wherein the resumable method is rewritten as a state machine wherein an invocation method for the resumable method is augmented with state machine logic, and specialized commands associated with the resumable method are rewritten into code for state transformation and suspension.

12. The method of claim 7, wherein the derived purpose specific driver class determines whether a particular control point is available and defines situations for which the particular control point is available.

13. A computer-readable storage memory comprising computer-executable instructions which when executed cause at least one processor to:

receive source code comprising a resumable method associated with a pattern, the resumable method comprising a syntactically distinguishable control point expression, wherein a compiler calls code that compiles with the pattern associated with the resumable method, the code in a library external to the compiler, the compiler creating a purpose specific driver class from the code;

transform the received source code into expanded source code, wherein the expanded source code includes callbacks to purpose specific methods inherited from the called code, wherein the callbacks are inserted into the expanded output code by the compiler, the inserted callbacks comprising a call to a method that is executed before the resumable method is paused, and a call to a method that is executed after the resumable method is resumed; and instantiating an object from the derived purpose specific driver class, the object representing a resumable method comprising an asynchronous method or an iterator or a symmetric co-routine.

14. The computer-readable storage memory of claim 13, comprising further computer-executable instructions, which when executed cause the at least one processor to:

add purpose specific behavior and purpose specific methods to the derived purpose specific driver class from a method of the called code.

15. The computer-readable storage memory of claim 13, comprising further computer-executable instructions, which when executed cause the at least one processor to:

create callbacks for a control point nested within a control structure of a programming language in which the received source code is written.

16. The computer-readable storage memory of claim 13, comprising further computer-executable instructions, which when executed cause the at least one processor to:

transform the received source code comprising the resumable method into expanded output code so that the expanded output code can be executed in discrete parts, each discrete part starting and ending at a control point in the expanded output code.

17. The computer-readable storage memory of claim 13, comprising further computer-executable instructions, which when executed cause the at least one processor to:

rewrite the resumable method as a state machine wherein an invocation method for the rewritten resumable method is augmented with state machine logic, and specialized commands associated with the resumable method are rewritten into code for state transformation and suspension in the rewritten resumable method.

* * * * *